US012671095B2

(12) United States Patent
    Xie et al.

(10) Patent No.:    US 12,671,095 B2
(45) Date of Patent:    Jun. 30, 2026

(54) CATHODE CATALYST LAYER AND PREPARATION METHOD AND USE THEREOF, AND FUEL CELL

(71) Applicant: Haidriver (Beijing) Energy Technology Co., Ltd, Beijing (CN)

(72) Inventors: Jiaping Xie, Beijing (CN); Wei Zhu, Beijing (CN); Ziqi Shang, Beijing (CN); Jun Shen, Beijing (CN)

(73) Assignee: Haidriver (Beijing) Energy Technology Co., Ltd, Beijing (CN)

( * ) Notice: Subject to any disclaimer, the term of this patent is extended or adjusted under 35 U.S.C. 154(b) by 504 days.

(21) Appl. No.: 18/235,252

(22) Filed: Aug. 17, 2023

(65) Prior Publication Data

US 2024/0072263 A1     Feb. 29, 2024

(30) Foreign Application Priority Data

Aug. 23, 2022    (CN) .......................... 202211010558.9

(51) Int. Cl.
   *H01M 4/88*       (2006.01)
   *H01M 4/86*       (2006.01)
   *H01M 4/92*       (2006.01)
(52) U.S. Cl.
   CPC ....... *H01M 4/8828* (2013.01); *H01M 4/8605* (2013.01); *H01M 4/8882* (2013.01); *H01M 4/926* (2013.01)

(58) Field of Classification Search
None
See application file for complete search history.

(56) References Cited

FOREIGN PATENT DOCUMENTS

CN       111463442 A   *   7/2020  .......... H01M 4/8882

OTHER PUBLICATIONS

Wang et al (CN 111463442 A), English Translation from FIT, 10 pages (Year: 2020).*

* cited by examiner

*Primary Examiner* — Colin W. Slifka
(74) *Attorney, Agent, or Firm* — Procopio, Cory, Hargreaves & Savitch LLP

(57)             ABSTRACT

Provided are a cathode catalyst layer and a preparation method and use thereof, and a fuel cell. The method includes: mixing a catalyst, water, and an alcohol with a pore-forming agent to obtain a mixture; dispersing the mixture into a Nafion solution to obtain a slurry; and coating the slurry onto a surface of a diffusion layer to obtain a coated diffusion layer, and subjecting the coated diffusion layer to calcination and freeze-drying in sequence to obtain the cathode catalyst layer.

19 Claims, 2 Drawing Sheets

CATHODE CATALYST LAYER AND PREPARATION METHOD AND USE THEREOF, AND FUEL CELL

CROSS-REFERENCE TO RELATED APPLICATION

This patent application claims the benefit and priority of Chinese Patent Application No. 202211010558.9 filed with the China National Intellectual Property Administration on Aug. 23, 2022, the disclosure of which is incorporated by reference herein in its entirety as part of the present application.

TECHNICAL FIELD

The present disclosure relates to the technical field of fuel cells, in particular to a cathode catalyst layer and a preparation method and use thereof, and a fuel cell.

BACKGROUND

Fuel cell is a main device for utilizing hydrogen energy, and shows environmental friendliness without pollution, and high start-up speed, and is not limited by Carnot cycle, thereby showing excellent energy conversion efficiency. A proton exchange membrane fuel cell unit is mainly composed of a membrane electrode, a sealing element, a flow field plate, and an end plate. The membrane electrode, as a key component of the proton exchange membrane fuel cell, includes a proton exchange membrane, a cathode/anode catalyst layer, and a cathode/anode diffusion layer, and is a main place where electrochemical reactions occur. The membrane electrode works according to the following working principles: hydrogen is transported to the anode catalyst layer, and then ionized into protons and electrons in the presence of a catalyst. The electrons are transported to the cathode through an external circuit, and the protons are transported through the proton exchange membrane to the cathode in the form of hydrated protons. Oxygen reaches the cathode catalyst layer at a cathode side, and the oxygen combines with the protons and electrons transferred from the anode to form water in the presence of a cathode catalyst. When the electrons pass through the external circuit, the fuel cell conducts external work in the form of electric energy. Specific electrode reactions and an overall reaction of the fuel cell are as follows:

Anode: $H_2 \rightarrow 2H^+ + 2d^-$;

Cathode: $\frac{1}{2}O_2 + 2H^+ + 2e^- \rightarrow H_2O$; and

Overall reaction: $H_2 + \frac{1}{2}O_2 \rightarrow H_2O$;

The catalyst layer is mainly composed of a catalyst and an electrolyte. In order to conduct an electrochemical reaction, it is necessary to meet a requirement of "three-phase reaction zone" of gas, liquid, and solid, that is, a three-phase interface junction of the catalyst, the electrolyte, and the gas. In order to improve the reaction rate, it is very important to improve proton transfer environment. According to the working principle, water obtained as a product is mainly produced in the cathode catalyst layer, but not in the anode catalyst layer. Excessive deposition of moisture in the cathode could easily lead to an increase in gas transport resistance and a decrease in three-phase reaction zones. On an anode side, protons are effectively conducted under a certain wetting state of dielectrics. Therefore, it is extremely important to find a way to transport the water from the cathode to the anode through the proton exchange membrane to improve the distribution of water in the membrane electrode.

Chinese patent 202010287060.1 discloses a catalyst layer, a fuel cell membrane electrode, and preparation methods thereof. Gradient design is conducted for a catalyst content and a pore size of the membrane electrode in different regions, such that the concentration of a reactant at the inlet is highly matched with the catalyst content, a water content of the gas outlet, and the number of macropores. In this way, a catalyst utilization rate and a drainage capacity of the membrane electrode are improved.

The existing design solution improves the catalyst utilization rate and drainage capacity, but shows uneven distribution of water in the cathode and the anode due to different electrode reactions.

SUMMARY

In view of this, an object of the present disclosure is to provide a cathode catalyst layer and a preparation method and use thereof. A cathode catalyst layer electrode provided in the present disclosure has a mesoporous structure, such that water inside the electrode could be evenly distributed.

To achieve the above object, the present disclosure provides the following technical solutions:

Provided is a method for preparing a cathode catalyst layer, including the following steps:

mixing a catalyst, water, and an alcohol with a pore-forming agent to obtain a mixture;

dispersing the mixture into a Nafion solution to obtain a slurry; and coating the slurry onto a surface of a diffusion layer to obtain a coated diffusion layer, and subjecting the coated diffusion layer to calcination and freeze-drying in sequence to obtain the cathode catalyst layer.

In some embodiments, the pore-forming agent includes one or more selected from the group consisting of ammonium oxalate, ammonium carbonate, and ammonium nitrate.

In some embodiments, the pore-forming agent has a particle size of 35 nm to 45 nm.

In some embodiments, the pore-forming agent has a mass 1-2 times that of the catalyst.

In some embodiments, the freeze-drying is conducted at a temperature of −40° C. to −10° C. for 40 min to 60 min.

In some embodiments, the catalyst is selected from the group consisting of Pt/C, Pt—Co/C, Pt—Ni/C, and Pt—Ru/C.

In some embodiments, the calcination is conducted at a temperature of 120° C. to 150° C. for 3 h to 5 h.

Also provided is a cathode catalyst layer prepared by the method described above, where the cathode catalyst layer has a mesoporous structure with a pore size of 5 nm to 40 nm.

Also provided is use of the cathode catalyst layer described above in the field of a fuel cell.

Also provided is a fuel cell, including a membrane electrode, an end plate, a bipolar plate, and a sealing element, where the membrane electrode is prepared by hot-laminating the cathode catalyst layer, an anode catalyst layer, and a proton exchange membrane.

The present disclosure provides a method for preparing a cathode catalyst layer, including the following steps: mixing a catalyst, water, and an alcohol with a pore-forming agent to obtain a mixture; dispersing the mixture into a Nafion solution to obtain a slurry; and coating the slurry onto a surface of a diffusion layer to obtain a coated diffusion layer, and subjecting the coated diffusion layer to calcination and freeze-drying in sequence to obtain the cathode catalyst layer.

In the present disclosure, water distribution inside the membrane electrode is improved by modifying the cathode catalyst layer with the pore-forming agent by freeze-drying, so as to obtain a cathode catalyst layer with a uniformly distributed mesoporous structure. A formular of the principle of capillary phenomenon is as follows:

$$h = \frac{2\alpha cos\theta}{r\rho g}$$

In the above formula, $\alpha$ represents a surface tension of a liquid, $\theta$ represents a contact angle between a surface of the liquid and a pore wall, r represents a pore radius, $\rho$ represents a density of the liquid, and g represents an acceleration of gravity. Since pores in the cathode catalyst layer are hydrophilic pores, $\theta < 90°$, $cos\theta > 0$, and the larger r, the smaller h. The pore-forming agent plays a role during the calcination to generate a mesoporous structure, and the mesoporous structure could be fixed by the freeze-drying to avoid mesopore collapse. The mesoporous structure is conducive to the transport of water generated by the cathode to the anode, which could not only avoid water flooding of the cathode, but also improve wettability and proton transport capacity of the anode, thereby improving adaptability of the fuel cell under various humidity conditions, prolonging a service life of the membrane electrode, and improving a performance of the fuel cell.

DETAILED DESCRIPTION OF THE EMBODIMENTS

Figure 1:
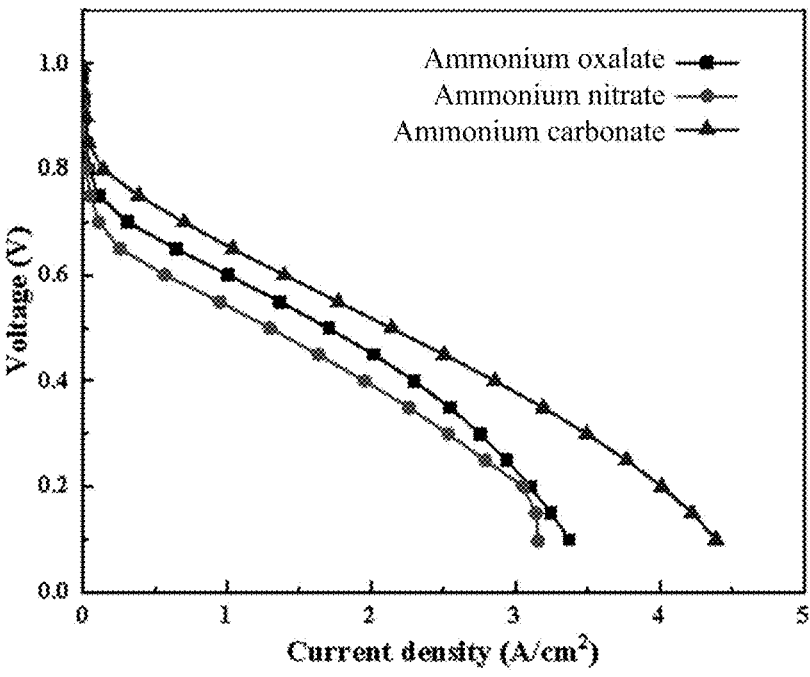
FIG. 1 shows a polarization curve of fuel cells obtained from different pore-forming agents according to Examples 1 to 3.

The present disclosure provides a method for preparing a cathode catalyst layer, including the following steps:

mixing a catalyst, water, and an alcohol with a pore-forming agent to obtain a mixture;

dispersing the mixture into a Nafion solution to obtain a slurry; and coating the slurry onto a surface of a diffusion layer to obtain a coated diffusion layer, and subjecting the coated diffusion layer to calcination and freeze-drying in sequence to obtain the cathode catalyst layer.

In the present disclosure, the catalyst, water, and the alcohol are mixed with a pore-forming agent to obtain a mixture.

In some embodiments, the pore-forming agent is one or more selected from the group consisting of ammonium oxalate, ammonium carbonate, and ammonium nitrate.

In some embodiments, the pore-forming agent has a particle size of 35 nm to 45 nm.

In some embodiments, the pore-forming agent has a mass 1 to 2 times, preferably 1.2 times that of the catalyst.

In some embodiments, the catalyst is selected from the group consisting of Pt/C, Pt—Co/C, Pt—Ni/C, and Pt—Ru/C.

In some embodiments, the alcohol is a solution of an alcohol having no more than 5 carbon atoms, and preferably one or more selected from the group consisting of ethylene glycol, isopropanol, n-butanol, isobutanol, and pentylene glycol. The alcohol is added to better disperse the catalyst.

In some embodiments, the catalyst has a mass 40% to 60% of a total mass of the catalyst, water, and the alcohol. In some embodiments, the water has a mass 20% to 30% of the total mass of the catalyst, water, and the alcohol. In some embodiments, the alcohol has a mass 10% to 40% of the total mass of the catalyst, water, and the alcohol.

In the present disclosure, there is no special limitation on the mixing, and a method well known to those skilled in the art may be used, such as stirring specifically.

After the mixture is obtained, the mixture is dispersed into a Nafion solution to obtain a slurry.

In some embodiments, the Nafion solution is added to the mixture.

In some embodiments, a ratio of a mass of the catalyst to a volume of the Nafion solution is in a range of 1 mg: (5-10) μL.

In some embodiments, the Nafion solution has a concentration of 5 wt %, and the Nafion solution is purchased from DuPont, USA.

After the slurry is obtained, the slurry is coated onto a surface of a diffusion layer to obtain a coated diffusion layer, and the coated diffusion layer is subjected to calcination and freeze-drying in sequence to obtain the cathode catalyst layer.

In some embodiments, the diffusion layer is purchased from Toray Industries, Inc., and includes a base layer made of polyacrylonitrile (PAN) and carbon fiber structure as well as a microporous layer made of carbon powder.

In the present disclosure, there is no special limitation on the coating, and a method well known to those skilled in the art may be used.

In some embodiments, the cathode catalyst layer has a noble metal loading amount of (0.1-0.25) mg/cm². There is no special limitation on the loading amount, as long as the noble metal loading amount could be guaranteed to be within the above range.

In some embodiments, the calcination is conducted at a temperature of 120° C. to 150° C., preferably 130° C. to 135° C. for 3 h to 5 h. In some embodiments, the calcination is conducted in a tubular furnace. During the calcination, the pore-forming agent is decomposed to generate mesopores.

In some embodiments, the calcination is conducted in a nitrogen atmosphere.

In some embodiments, the freeze-drying is conducted at a temperature of −40° C. to −10° C., preferably −30° C. to −20° C., and more preferably −25° C. In some embodiments, the freeze-drying is conducted for 40 min to 60 min, preferably 45 min to 55 min , and more preferably 50 min.

The present disclosure further provides a cathode catalyst layer prepared by the method described above, where the cathode catalyst layer has a mesoporous structure with a pore size of 5 nm to 40 nm.

The present disclosure further provides use of the cathode catalyst layer in the field of a fuel cell. There is no special limitation on the manner of the use, and manners well known to those skilled in the art may be used.

The present disclosure further provides a fuel cell, including a membrane electrode, an end plate, a bipolar plate, and a sealing element, where the membrane electrode is prepared by hot-laminating the cathode catalyst layer, an anode catalyst layer, and a proton exchange membrane.

In some embodiments, the anode catalyst layer includes Pt, and a content of the Pt in the anode catalyst layer is in a range of (0.025-0.05) mg/cm$^2$.

In some embodiments, the proton exchange membrane is a Nafion 117 membrane produced by DuPont Company, USA.

In some embodiments, the hot-laminating is conducted at a pressure of 0.2 1MPa to 0.5 MPa, and preferably 0.2 MPa to 0.4 MPa. In some embodiments, the hot-laminating is conducted for 120 s to 150 s, and preferably 125 s to 140 s.

In the present disclosure, there is no special limitation on the type of the end plate, the bipolar plate, and the sealing element, and types well known to those skilled in the art may be used.

In the present disclosure, there is no special limitation on the method for preparing the fuel cell, and methods well known to those skilled in the art may be used.

To further explain the present disclosure, the cathode catalyst layer and the method and the use thereof provided in the present disclosure will be described in detail below in conjunction with examples which, however, should not be interpreted as limitations to the scope of the present disclosure.

EXAMPLE 1

(1) 10 mg of a Pt/C catalyst (40 wt % Pt, JM Company) and 10 mg of a solid ammonium carbonate powder (particle size 35 nm) were mixed with 1 mL of deionized water and 1 mL of isopropanol, and ultrasonically treated for 40 min, while a state of an obtained reaction solution was observed every 10 min.

(2) After the ultrasonic treatment was completed, 0.075 mL of a Nafion solution (5 wt %, DuPont) was added into the reaction solution obtained in step (1), and ultrasonically treated for another 20 min to obtain an uniformly mixed slurry.

(3) The uniformly mixed slurry obtained above was evenly coated onto a (5×5) cm$^2$ diffusion layer, and then calcined in a tubular furnace at 135° C. for 3 h in a nitrogen atmosphere.

(4) A calcined product obtained in step (3) was freeze-dried in a freeze dryer at −20° C. for 40 min to obtain a cathode catalyst layer with mesopores with a pore size of 5 nm to 40 nm.

(5) The cathode catalyst layer obtained in step (4) was hot-laminated with an anode catalyst layer with a Pt loading amount of 0.025 mg/cm$^2$ and a (10×10) cm$^2$ proton exchange membrane (Nafion117, DuPont) at 0.4 MPa for 125 s to obtain a membrane electrode.

(6) The membrane electrode obtained in step (5) was assembled with an end plate, a bipolar plate, and a sealing element to form a fuel cell test system. An activation process was conducted as follows: pressures of hydrogen and oxygen were increased to 0.1 MPa and 0.15 MPa, respectively, humidity of hydrogen and oxygen were adjusted to 70 RH and 40 RH, respectively, a current density was set as 250 mA/cm$^2$, and a battery temperature was slowly raised to 60° C. Under such circumstances, the activation process was conducted for 4 h. Then, the pressures of hydrogen and oxygen were adjusted to 0.25 MPa and 0.35 MPa, respectively, the humidity of hydrogen and oxygen were adjusted to 80 RH and 60 RH, respectively, the current density was set as 400 mA/cm$^2$, and the battery temperature was reached at 75° C. After running stably, a polarization-power curve of the battery was determined under H$_2$ and Air conditions.

EXAMPLE 2

(1) 12.5 mg of a Pt—Co/C catalyst (30 wt % Pt, JM Company) and 15 mg of a solid ammonium nitrate powder (particle size 40 nm) were mixed with 1 mL of deionized water and 1 mL of ethylene glycol, and ultrasonically treated for 50 min, while a state of an obtained reaction solution was observed every 10 min.

(2) After the ultrasonic treatment was completed, 0.08 mL of a Nafion solution (5 wt %, DuPont) was added into the reaction solution obtained in step (1), and ultrasonically treated for another 20 min to obtain an uniformly mixed slurry.

(3) The uniformly mixed ink-like slurry obtained above was evenly coated onto a (5×5) cm$^2$ diffusion layer, and then calcined in a tubular furnace at 130° C. for 3 h in a nitrogen atmosphere.

(4) A calcined product obtained in step (3) was freeze-dried in a freeze dryer at −25° C. for 40 min to obtain a cathode catalyst layer with mesopores with a pore size of 5 nm to 40 nm.

(5) The cathode catalyst layer obtained in step (4) was hot-laminated with an anode catalyst layer with a Pt loading amount of 0.025 mg/cm$^2$ and a (10×10) cm$^2$ proton exchange membrane (Nafion117, DuPont) at 0.3 MPa for 125 s to obtain a membrane electrode.

(6) The membrane electrode obtained in step (5) was assembled with an end plate, a bipolar plate, and a sealing element to form a fuel cell test system. An activation process was conducted as follows: pressures of hydrogen and oxygen were increased to 0.1 MPa and 0.15 MPa, respectively, humidity of hydrogen and oxygen were adjusted to 70 RH and 40 RH, respectively, a current density was set as 250 mA/cm$^2$, and a battery temperature was slowly raised to 60° C. Under such circumstances, the activation process was conducted for 4 h. Then, the pressures of hydrogen and oxygen were adjusted to 0.25 1MPa and 0.35 MPa, respectively, the humidity of hydrogen and oxygen were adjusted to 80 RH and 60 RH, respectively, the current density was set as 400 mA/cm$^2$, and the battery temperature was reached at 75° C. After running stably, a polarization-power curve of the battery was determined under H$_2$ and Air conditions.

EXAMPLE 3

(1) 15 mg of a Pt/C catalyst (60 wt % Pt, JM Company) and 15 mg of a solid ammonium oxalate powder (particle size 45 nm) were mixed with 1 mL of deionized water and 1.5 mL of ethylene glycol, and ultrasonically treated for 50 min, while a state of an obtained reaction solution was observed every 10 min.

(2) After the ultrasonic treatment was completed, 0.08 mL of a Nafion solution (5 wt %, DuPont) was added into the reaction solution obtained in step (1), and ultrasonically treated for another 20 min to obtain an uniformly mixed ink-like slurry.

(3) The uniformly mixed ink-like slurry obtained above was evenly coated onto a (5×5) cm$^2$ diffusion layer, and calcined in a tubular furnace and then at 130° C. for 3 h in a nitrogen atmosphere.

(4) A calcined product obtained in step (3) was freeze-dried in a freeze dryer at −30° C. for 50 min to obtain a cathode catalyst layer with mesopores with a pore size of 5 nm to 40 nm.

(5) The cathode catalyst layer obtained in step (4) was hot-laminated with an anode catalyst layer with a Pt loading amount of 0.025 mg/cm² and a (10×10) cm² proton exchange membrane (Nafion117, DuPont) at 0.3 MPa for 125 s to obtain a membrane electrode.

(6) The membrane electrode obtained in step (5) was assembled with an end plate, a bipolar plate, and a sealing element to form a fuel cell test system. An activation process was conducted as follows: pressures of hydrogen and oxygen were increased to 0.1 MPa and 0.15 MPa, respectively, humidity of hydrogen and oxygen were adjusted to 70 RH and 40 RH, respectively, a current density was set as 250 mA/cm², and a battery temperature was slowly raised to 60° C. Under such circumstances, the activation process was conducted for 4 h. Then, the pressures of hydrogen and oxygen were adjusted to 0.25 MPa and 0.35 MPa, respectively, the humidity of hydrogen and oxygen were adjusted to 80 RH and 60 RH, respectively, the current density was set as 400 mA/cm², and the battery temperature was reached at 75° C. After running stably, a polarization-power curve of the battery was determined under H₂ and Air conditions.

COMPARATIVE EXAMPLE 1

(1) 10 mg of a Pt/C catalyst (40 wt % Pt, JM Company) was mixed with 1 mL of deionized water and 1 mL of isopropanol, and ultrasonically treated for 40 min, while a state of an obtained reaction solution was observed every 10 min.

(2) After the ultrasonic treatment was completed, 0.075 mL of a Nafion solution (5 wt %, DuPont) was added into the reaction solution obtained in step (1), and ultrasonically treated for another 20 min to obtain an uniformly mixed ink-like slurry.

(3) The uniformly mixed ink-like slurry obtained above was evenly coated onto a (5×5) cm² diffusion layer, and calcined in a tubular furnace at 135° C. for 3 h in a nitrogen atmosphere to obtain a cathode catalyst layer with a pore size of 0.2 nm to 5 nm.

(4) The cathode catalyst layer obtained in step (3) was hot-laminated with an anode catalyst layer with a Pt loading amount of 0.025 mg/cm² and a (10×10) cm² proton exchange membrane (Nafion117, DuPont) at 0.4 MPa for 125 s to obtain a membrane electrode.

(5) The membrane electrode obtained in step (4) was assembled with an end plate, a bipolar plate, and a sealing element to form a fuel cell test system. An activation process was conducted as follows: pressures of hydrogen and oxygen were increased to 0.1 MPa and 0.15 MPa, respectively, humidity of hydrogen and oxygen were adjusted to 70 RH and 40 RH, respectively, a current density was set as 250 mA/cm², and a battery temperature was slowly raised to 60° C. Under such circumstances, the activation process was conducted for 4 h. Then, the pressures of hydrogen and oxygen were adjusted to 0.25 MPa and 0.35 MPa, respectively, the humidity of hydrogen and oxygen were adjusted to 80 RH and 60 RH, respectively, the current density was set as 400 mA/cm², and the battery temperature was reached at 75° C. After running stably, a polarization-power curve of the battery was determined under H₂ and Air conditions.

FIG. 1 shows polarization curves of fuel cells obtained from different pore-forming agents of Examples 1-3. It is seen that ammonium carbonate has the largest polarization current density, followed by ammonium oxalate and ammonium nitrate in sequence. The reason is that ammonium carbonate has been decomposed at 40° C., and when being heated to a high temperature, the ammonium carbonate has been completely decomposed, resulting in more mesopores. After freezing and forming, a three-phase reaction interface could be effectively formed by the generated mesopores, avoiding the occurrence of water flooding.

Figure 2:
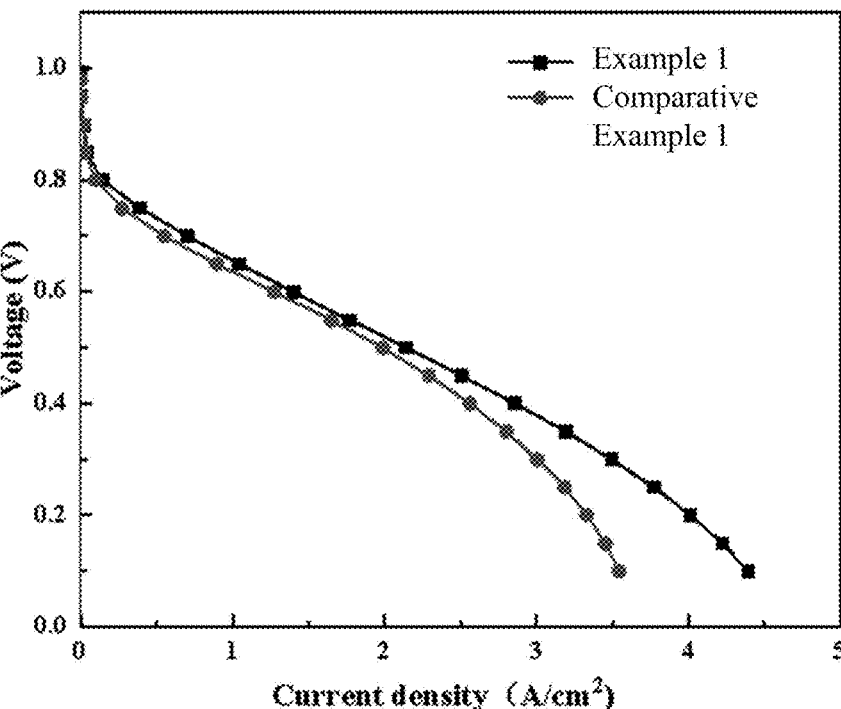
FIG. 2 shows a polarization curve of fuel cells according to Example 1 and Comparative Example 1.

FIG. 2 shows polarization curves of the fuel cells of Example 1 and Comparative Example 1. From FIG. 2, it can be seen that the increase of the pore-forming agent makes it possible to greatly improve the maximum current density of the polarization curve. Compared with an ordinary catalyst layer, the mesoporous structure makes the three-phase reaction more complete.

Figure 3:
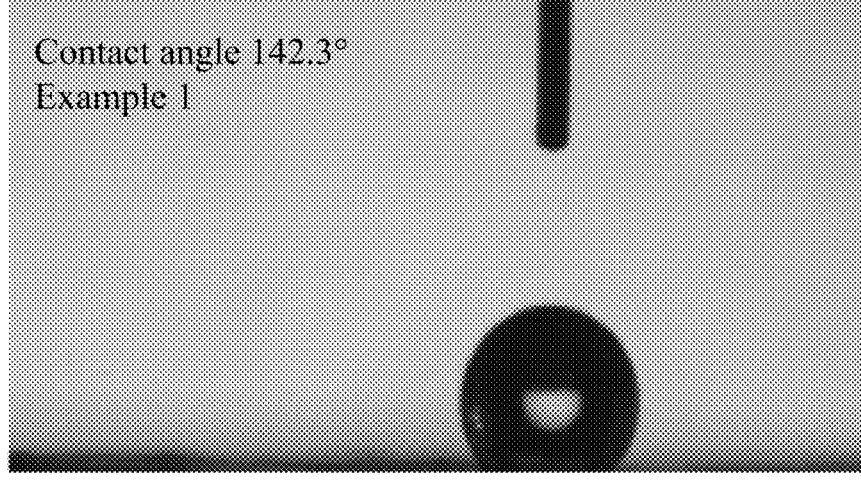
FIG. 3 shows a contact angle of a cathode catalyst layer according to Example 1.
Figure 4:
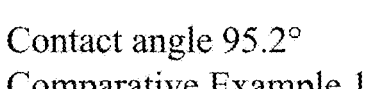
FIG. 4 shows a contact angle of a cathode catalyst layer according to Comparative Example 1.
Figure 4:
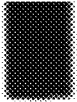
Figure 4:
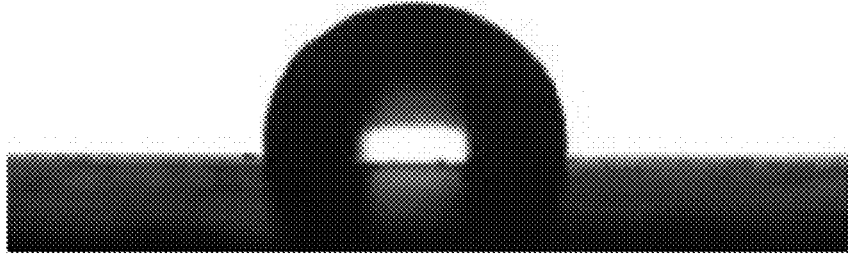

FIG. 3 shows a contact angle of the cathode catalyst layer of Example 1, and FIG. 4 shows a contact angle of the cathode catalyst layer of Comparative Example 1. From FIG. 3 and FIG. 4, it can be seen that a surface of the cathode catalyst layer prepared by the ammonium carbonate pore-forming agent has a strong hydrophobic property, matching the results of the polarization curve test. However, a surface of the cathode catalyst layer without pore-forming agents has a general hydrophobic property, which is likely to cause water flooding.

The above described are merely preferred embodiments of the present disclosure rather than limitations to the present disclosure in any form. It should be pointed out that those skilled in the art could make several improvements and modifications without departing from the principle of the present disclosure, and these improvements and modifications should fall within the scope of the present disclosure.

What is claimed is:

1. A method for preparing a cathode catalyst layer, comprising the following steps:
   mixing a catalyst, water, and an alcohol with a pore-forming agent to obtain a mixture;
   dispersing the mixture into a Nafion solution to obtain a slurry; and
   coating the slurry onto a surface of a diffusion layer to obtain a coated diffusion layer, and subjecting the coated diffusion layer to calcination and freeze-drying in sequence to obtain the cathode catalyst layer.

2. The method of claim 1, wherein the pore-forming agent comprises one or more selected from the group consisting of ammonium oxalate, ammonium carbonate, and ammonium nitrate.

3. The method of claim 2, wherein the pore-forming agent has a particle size of 35 nm to 45 nm.

4. The method of claim 1, wherein the pore-forming agent has a particle size of 35 nm to 45 nm.

5. The method of claim 4, wherein the pore-forming agent has a mass 1 to 2 times that of the catalyst.

6. The method of claim 1, wherein the pore-forming agent has a mass 1 to 2 times that of the catalyst.

7. The method of claim 1, wherein the freeze-drying is conducted at a temperature of −40° C. to −10° C. for 40 min to 60 min.

8. The method of claim 1, wherein the catalyst is selected from the group consisting of Pt/C, Pt—Co/C, Pt—Ni/C, and Pt—Ru/C.

9. The method of claim 1, wherein the calcination is conducted at a temperature of 120° C. to 150° C. for 3 h to 5 h.

10. A cathode catalyst layer prepared by the method of claim 1, wherein the cathode catalyst layer has a mesoporous structure with a pore size of 5 nm to 40 nm.

11. The cathode catalyst layer of claim 10, wherein the pore-forming agent comprises one or more selected from the group consisting of ammonium oxalate, ammonium carbonate, and ammonium nitrate.

12. The cathode catalyst layer of claim 10, wherein the pore-forming agent has a particle size of 35 nm to 45 nm.

13. The cathode catalyst layer of claim 10, wherein the pore-forming agent has a mass 1 to 2 times that of the catalyst.

14. The cathode catalyst layer of claim 10, wherein the catalyst is selected from the group consisting of Pt/C, Pt—Co/C, Pt—Ni/C, and Pt—Ru/C.

15. A fuel cell, comprising a membrane electrode, an end plate, a bipolar plate, and a sealing element, wherein the membrane electrode is prepared by hot-laminating the cathode catalyst layer of claim 10, an anode catalyst layer, and a proton exchange membrane.

16. The fuel cell of claim 15, wherein the pore-forming agent comprises one or more selected from the group consisting of ammonium oxalate, ammonium carbonate, and ammonium nitrate.

17. The fuel cell of claim 15, wherein the pore-forming agent has a particle size of 35 nm to 45 nm.

18. The fuel cell of claim 15, wherein the pore-forming agent has a mass 1 to 2 times that of the catalyst.

19. The fuel cell of claim 15, wherein the catalyst is selected from the group consisting of Pt/C, Pt—Co/C, Pt—Ni/C, and Pt—Ru/C.

\* \* \* \* \*